United States Patent [19]

Gelinas et al.

[11] Patent Number: 4,979,141

[45] Date of Patent: Dec. 18, 1990

[54] TECHNIQUE FOR PROVIDING A SIGN/MAGNITUDE SUBTRACTION OPERATION IN A FLOATING POINT COMPUTATION UNIT

[75] Inventors: Robert G. Gelinas, Westboro; Thomas V. Radogna, Framingham, both of Mass.

[73] Assignee: Data General Corporation, Westboro, Mass.

[21] Appl. No.: 250,418

[22] Filed: Sep. 28, 1988

[51] Int. Cl.$^5$ ............................................. G06F 7/50
[52] U.S. Cl. ..................................... 364/787; 364/748
[58] Field of Search ........................ 364/784, 787, 788

[56] References Cited

U.S. PATENT DOCUMENTS 3,814,925  6/1974  Spannagel ........................... 364/787
4,319,335  3/1982  Rubinfield ........................... 364/787
4,811,272  3/1989  Wolrich et al. ..................... 364/788

Primary Examiner—Gary V. Harkcom
Assistant Examiner—Tan V. Mai
Attorney, Agent, or Firm—Robert F. O'Connell

[57] ABSTRACT

A system for use in a floating point computation unit for providing a sign/magniture subtraction operation, which system uses propagate/generate logic responsive to the subtraction operands to produce intermediate and final propagate and generate outputs. First carry computation logic is responsive to the final propagate and generate outputs and to a carry-in bit to produce final carry outputs and a carry-out bit. The latter outputs are used to produce a first subtraction result. Second carry computation logic responds to the intermediate propagate and generate outputs to produce second final carry outputs. The latter outputs and selected intermediate propagate outputs are used to produce a second subtraction result. The carry-out bit then selects one of the two subtraction results as the final subtraction result.

5 Claims, 5 Drawing Sheets

TECHNIQUE FOR PROVIDING A SIGN/MAGNITUDE SUBTRACTION OPERATION IN A FLOATING POINT COMPUTATION UNIT

INTRODUCTION

This invention relates generally to floating point unit computation techniques performed by data processing systems and, more particularly, to certain techniques for improving the costs and/or speed of operation of floating point computations.

BACKGROUND OF THE INVENTION

In performing floating point computations in a floating point unit of a data processing system, it is desirable to reduce the cost of components required for such computations without increasing the time for performing a particular computation operation thereof and/or to shorten the overall computation time for certain operations as effectively as possible without unduly increasing the overall cost in structure or operation of the unit. Thus, for example, it is desirable to improve conventionally used techniques for performing mantissa subtraction operations, for performing normalization operations, and for performing division operations. Conventional techniques often take several operating cycles for such operations or require too many costly circuit elements to achieve the desired speed of operation and it is desirable to be able to perform such operations within one or a few cycles or with fewer components if possible.

In performing a sign/magnitude mantissa subtraction operation, for example, conventional techniques utilize multi-stage propagate/generate carry techniques for producing a subtraction result, e.g., a subtraction of operands A and B, algebraically represented by (A−B), and then utilize a complete redundant set of propagate/generate carry stages for producing the negative result, i.e., (B−A). The highest order carry-out bit of the (A−B) process is then used to determine which result to select in accordance with well-known binary arithmetic techniques. The need for a complete redundant set of propagate/generate carry stages undesirably increases the cost of the overall system in performing such operation. Other techniques which have been proposed to reduce costs by using fewer components have undesirably increased the overall time needed to perform the operation. It is desirable to perform the operations at as low a cost as possible without increasing the time required for the performance thereof.

Further, in performing normalization techniques on exponent and mantissa results, conventional approaches utilize priority encoder circuitry for analyzing the overall exponent computation result in order to determine the number of leading zeroes therein. Once the number of leading zeroes is determined, such number is subtracted from the exponent value and the mantissa value is shifted to the left to eliminate the leading zeroes in accordance with well-known normalization techniques. The use of a priority encoder to operate upon the overall result in order to detect the number of leading zeroes has been found to undesirably increase the overall time needed for such operation. It is desirable therefore to determine the number of leading zeroes in a manner which would substantially reduce the conventionally required normalization time without unduly increasing the cost thereof.

Further, in performing division operations using higher radix techniques, i.e., higher than radix 2, one of the quantities required to be obtained in the divisional algorithm is the value of the quotient (Q) times the remainder (REMR) subtracted from the remainder (REMR) which quantity is normally obtained by prestoring values of Q*REMR and obtaining the desired prestored value for a plurality of values of Q and REMR. High radix computation techniques are well known to the art. Once the prestored value of Q*REMR is accessed from the memory region where it is pre-stored, it is subtracted from REMR and the division operation is completed. Such a technique requires a relatively large amount of time for the pregeneration of prestored Q*REMR values and a relatively large storage region, therefor. Moreover, the accessing of the desired quantity (REMR −Q*REMR) therefrom and the subtraction thereof from the remainder using high radix techniques normally takes a relatively long time. It would be desirable to perform such overall operations in a much shorter time and to avoid the need for such a large storage region for such purpose.

BRIEF SUMMARY OF THE INVENTION

In order to reduce the component costs for performing a sign/magnitude mantissa subtraction operation without increasing the time required therefor in comparison with conventional techniques, the invention avoids the need for using a completely redundant propagate/generate carry system and makes use of a portion of the same propagate/generate carry stages for both the (A−B) and (B−A) subtraction operations. The remaining carry generator stages are used to complete the (A−B) operation to achieve a first result R, while a number of more simplified carry generator stages are used to complete the (B−A) operation to achieve the negative result −R. The carry out bit from the (A−B) operation then determines which result, i.e., R or −R, is to be used as the desired subtraction result. The use of common propagate/generate carry stages in determining both results and the use of simplified stages to complete the inverse subtraction result reduces the overall cost of the subtraction operation as compared with previously used techniques.

Further, in performing a normalization of a floating point computational result, the invention uses a novel technique in which the number of leading zeroes in each slice of a multi-slice exponent result is readily determined. Appropriate circuitry is then utilized in parallel with such determination to respond to each multi-slice result and such leading zero determination operation so as to determine which of the slices thereof is the highest order slice containing the first non-zero bit. Such slice is selected as the first higher order slice of the normalized result so that the number of zeroes therein, as well as in any higher order slices, is thereby readily determined. The number of leading zeroes is then suitably subtracted from the exponent value in such parallel operation and the mantissa result is appropriately left-shifted in order to perform the overall normalization process. Such approach has been found to increase the speed of the normalization process in comparison with the use of priority encoder circuitry operating on an entire exponent result.

Further, in performing a divide operation the invention utilizes an on-the-fly computation of the quantity (REMR−Q*REMR) by utilizing selected components of the multiplier circuitry of the floating point unit.

Because of such on-the-fly operation, the desired final output quotient value is obtained more rapidly and without the need for a large storage region as in conventionally known techniques.

DESCRIPTION OF THE INVENTION

The invention can be described in more detailed with the help of the drawings wherein.

Figure 1:
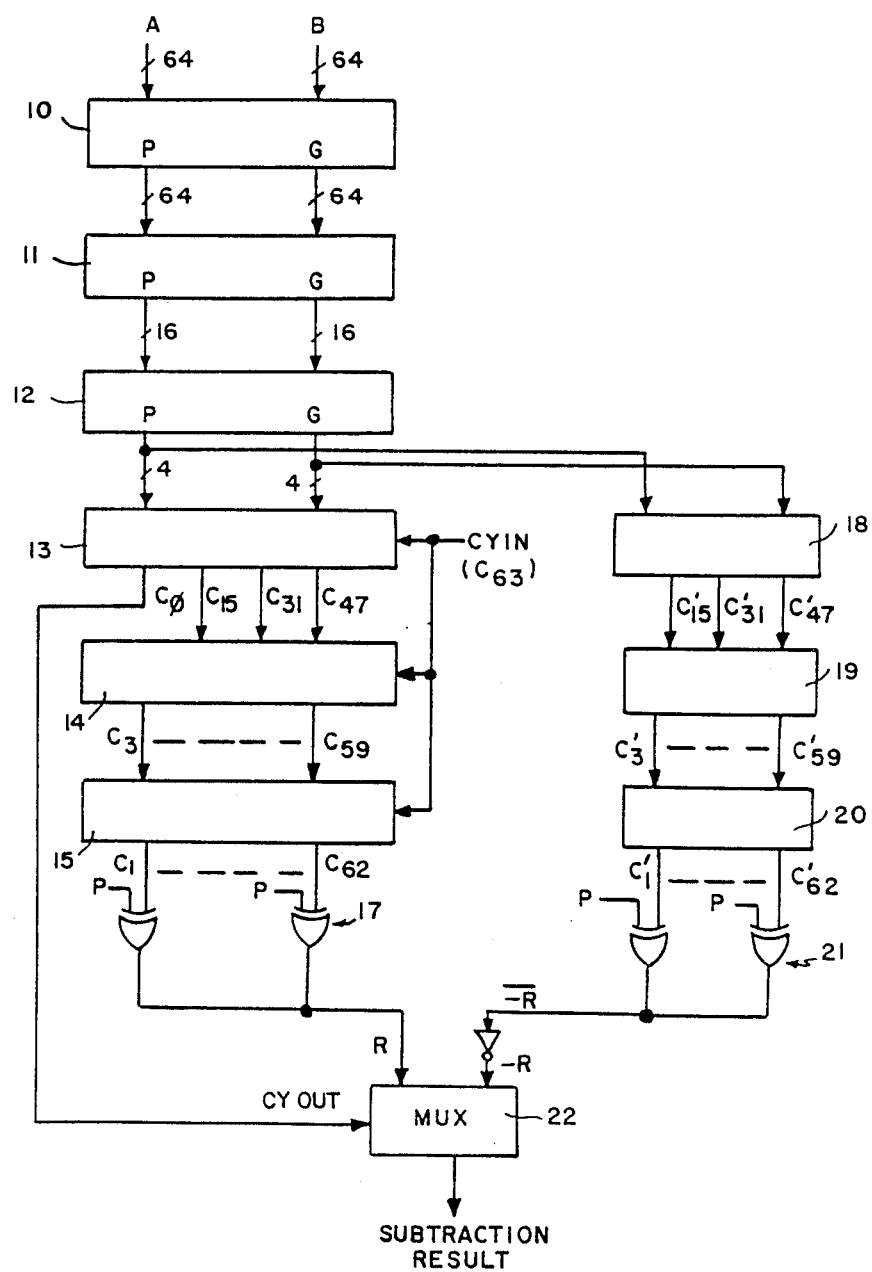
FIG. 1 depicts a block diagram of a portion of a floating point computation unit for use in performing an improved subtraction operation in accordance with the invention.

FIG. 1 shows a block diagram which illustrates a particular embodiment of the technique of the invention in improving the performance of a subtraction operation of a mantissa in a floating point unit. As can be seen therein, the subtraction of two operands, e.g., $(A-B)$, is carried out in a conventional floating point unit by an addition process wherein the binary digital addition can be represented by the quantity $(A+\bar{B}+1)$, where $\bar{B}$ is the logical inverse of B, which quantity is in effect the algebraic equivalent of $(A-B)$. Such technique is well known and is performed by utilizing a number of propagate/generate carry stages as depicted in FIG. 1. Thus, in a system which utilizes 64-bit operands A and B, such operands are supplied to the first stage of a plurality of successive stages 10–12 of propagate/generate carry logic which produce, respectively, 64-bit, 16-bit and 4-bit propagate (P) and generate (G) outputs in accordance with conventional propagate/generate carry stage operations. The P and G outputs of generator stage 12 are supplied to a carry generator stage 13 which has a carry-in bit (CY IN) inserted at bit 63 thereof and is identified as $(C_{63})$ so as to produce 3 output carry bits at bit positions 15, 31 and 47 ($C_{15}$, $C_{31}$ and $C_{47}$) and a carry-out bit ($C_O$). Further carry bits are supplied, as shown, at stages 14 and 15, to which the CY IN bit is also supplied, the carry outputs of stage 15 thereupon being combined at exclusive-or gates 17 with the corresponding propagation bits P of the P outputs of stage 10, as would be well-known, to provide an output result R which in effect represents algebraically the subtraction of operand B from operand A, i.e., $(A-B)$.

The operation of such stages 10–15 is well known to the art and has been used for many years to provide a subtraction result R, or $(A-B)$ for a pair of input operands A and B.

In order to obtain the negative result $(B-A)$, which can be referred to as $-R$, it has been conventional to utilize essentially a completely redundant set of all the same stages of operation for performing a $(B-A)$ operation (in this case $B+\bar{A}+1$), and then to select the appropriate result, R or $-R$, in accordance with the carry out bit, as is well-known for conventional handling of such a subtraction process.

In accordance with the invention, however, the process for obtaining $-R$ is greatly simplified by utilizing the P and G outputs from propagate/generate stage 12 for supply to a plurality of simplified carry generator stages 18, 19 and 20 as depicted in FIG. 1. In such operation, in order to obtain the $(B-A)$ result, no carry in (CY IN) bit is required at such stages and, accordingly, the logic required at each of such stages to produce the required output carry bits from the last stage 20 can be simplified. The carry bits from stage 20 are suitably combined with the propagation bits P at exclusive-or gates 21 to produce the $-\bar{R}$ output as shown. In the figure, for convenience, the carry bits from each of such stages each use the notation C' to distinguish them from the carry bits generated at stages 13, 14 and 15.

The R and $-R$ outputs are supplied to a multiplexer circuit 22 ($-\bar{R}$ being inverted to produce $-R$ as shown) which selects one or the other result depending on the presence or absence of a carry out ($C_O$) bit from stage 13 to produce the desired subtraction result, i.e., either $(A-B)$ or $(B-A)$.

The use of common propagate/generate stages 10–12 together with simplified carry stages 18–20, as opposed to an entire redundant set of all of the stages 10–15, for determining the $-R$ result reduces the number of components required and the corresponding costs thereof over conventional approaches, without sacrificing the speed of the subtraction operation process since the results R and $-R$ are computed substantially simultaneously for supply to multiplexer 22.

Figure 2:
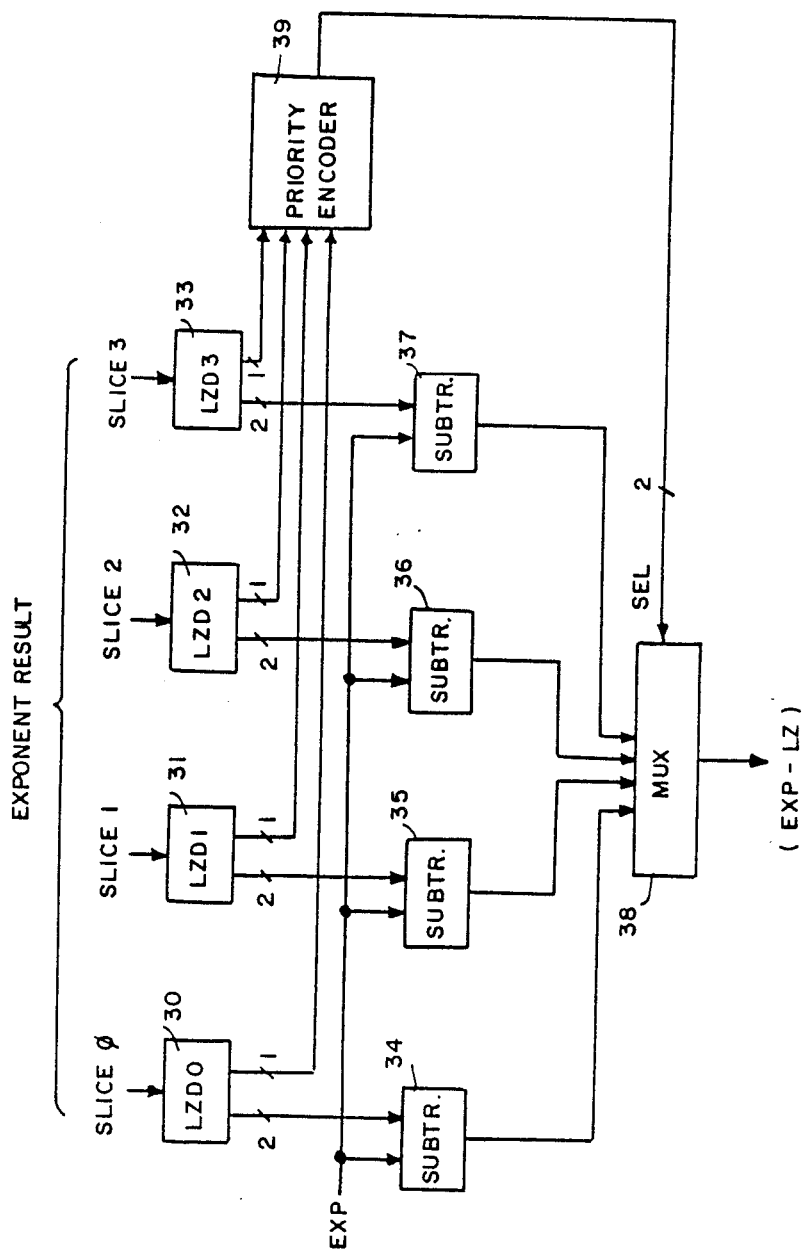
FIG. 2 depicts a block diagram of a portion of a floating point computation unit for use in performing an improved normalization operation in accordance with the invention.

In connection with the normalization of a floating point result it is necessary to determine the number of leading zeroes in the overall mantissa result, to subtract the number of leading zeroes from the exponent result, and to shift the computed mantissa result to the left by such number to produce a normalized floating point result. Such operation is well known to the art and is normally performed by examining the entire mantissa result using well-known priority encoder circuitry to calculate the number of leading zeroes. The number of leading zeroes obtained by such calculation is subtracted from the exponent result. The appropriate mantissa shift to the left is then performed to eliminate the leading zeroes therein. The operation of such priority encoder circuitry, particularly for a 64-bit result, for example, requires a relatively long computation time for such process. Accordingly, it is desirable to provide a different approach which reduces the computation time for such floating point normalization operation without unduly increasing the cost or numbers of circuit elements needed for such purpose. FIG. 2 discloses in block diagram form an embodiment of the invention which provides a unique and useful alternative normalization technique.

As can be seen therein, a 64-bit mantissa result is supplied in four hexidecimal slices (from the highest order slice 0 to the lowest order slice 3) to each of a plurality of leading zero detection circuits 30, 31, 32 and 33, respectively. In a hexidecimal system, as would be well-known to the art, each slice is represented by four hexidecimal digits and, accordingly, the leading zeroes thereof are represented by one of five conditions. Thus, for no leading zeroes, the first hexidecimal digit is non-zero; for one leading zero, the first hexidecimal digit is zero; for two leading zeroes, the first two hexidecimal digits are zero; and for three leading zeroes, the first three hexidecimal digits are zero. A fifth special condition can occur where all four hexidecimal digits are zero.

Such conditions can be represented in effect by 3-bits, i.e., a highest order single bit output and two lower order output bits with respect to each 4-digit hexidecimal slice, as shown by the 1-bit and 2-bit outputs, respectively, at each leading zero detection circuit in FIG. 2. Thus, the first four conditions are represented in each slice by the 3-bits, 000, 001, 010, and 011 while the fifth condition in which all zeroes are present is 1XX.

bit of the 3-bit leading zero output is other than a "1" (if such highest order bit is a "1" then the slice has all zeroes and is not the slice in which such transitions occur). Such selection is made by a 2-bit (SEL) input to multiplexer 38 which is determined by a relatively simple priority encoder circuit 39 using the highest order of the output bits from each leading zero detector in accordance with the following table:

| Priority Encoder Inputs From | | | | Priority Encoder Output | Highest Order Bit Slice Where Highest order bit of |
|---|---|---|---|---|---|
| LZD0 | LZD1 | LZD2 | LZD3 | (SEL) | LZD is not "1" |
| 0 | X | X | X | 00 | Slice 0 |
| 1 | 0 | X | X | 01 | Slice 1 |
| 1 | 1 | 0 | X | 10 | Slice 2 |
| 1 | 1 | 1 | 0 | 11 | Slice 3 |
| 1 | 1 | 1 | 1 | Exponent Forced to Zero | |

X = Do Not Care

However, while the number of leading zeroes in each slice can be so determined, the slice containing the first transition from leading zeroes to the first non-zero hexidecimal digit (i.e., the start) of the overall result has not yet been determined.

To make such determination, the low order 2-bits of the leading zero detector output from each of the zero detection circuits 30–33 associated with each slice are supplied to a corresponding one of a plurality of subtraction circuits 34–37, respectively. Each of the subtraction circuits 34–37 also receives the overall exponent result (EXP) and thereupon subtracts from it the number of leading zeroes in the corresponding slice plus, in each case, a number of zeroes equal to the total number of hexidecimal digits in each higher order slice. Thus, each subtraction circuit performs the desired subtraction as if it were the slice in which the transition from leading zeroes to the first (non-zero) bit of the final exponent result has occurred.

Thus, for example, if the slices are identified as bit slices ∅, 1, 2 and 3 (from highest to lowest order thereof), subtraction circuit 34 subtracts from the overall exponent result the number of leading zeroes detected by leading zero detector 30 as if the highest order slice ∅, were the one in which the leading zero to non-zero bit transition has occurred. Subtraction circuit 35 subtracts from the exponent result the number of leading zeroes determined by leading zero detector 31 for the next higher order hexidecimal digits slice 1 plus the total number of digits in the highest order bit slice ∅, as if the transition had occurred in the next higher order bit slice 1. In a similar manner subtraction circuits 36 and 37 subtract from the exponent result the number of leading zeroes detected for bit slices 3 and 4, respectively, plus a total number of digits in all of the respective higher order bit slices on the assumption in each case that bit slices 2 and 3, respectively, are the bit slices in which the transition has occurred.

Having performed the above subtractions, the results of such subtractions are supplied to a multiplexer circuit 38 whereupon the subtraction result for the bit slice in which the actual transition from leading zeroes to the first bit of the exponent value has occurred is selected as the output of multiplexer 38 and represents the exponent value with the correct number of leading zeroes subtracted therefrom. From the above discussion, it can be seen that the first slice at which the transition occurs is the first higher order slice in which the highest order For example, if slice 1 is the slice in which such transition occurs, the 1-bit values from each of the LZD's are 10XX and the priority encoder produces the SEL bits (01) to select the output of subtraction circuit 35. The mantissa result is then appropriately shifted by the number of leading zeroes which have been detected by appropriate means, i.e., the number of leading zeroes in the selected slice 1 plus the leading zeroes represented by all higher order slices.

The parallel operation of leading zero detectors 30 through 33 and subtraction circuits 34–37 and the selection of the output of multiplexer 38 can be performed in a single floating point operating cycle so that normalization occurs much more rapidly by utilizing such a technique than when utilizing a larger priority encoder which operates on an overall 64-bit mantissa result to determine the number of leading zeroes therein. The latter approach often takes more than one cycle and in some cases several cycles.

Another aspect of a floating point computation unit for improving the operation thereof relates to a novel technique for performing a divide operation in a manner which makes the most effective use of available floating point components, so as to reduce the number of components needed therefor and to perform the divide operation in a shorter time period than using conventional techniques.

In using a conventional division algorithm, as in the technique described below, the algorithm requires the multiplication of the divisor by the quotient and the subtraction of such result from the remainder. Such functions are normally performed by prestoring divisor/quotient products and then, using the remainder, selecting the correct prestored value for such purpose. In such an approach, as mentioned above, not only is a relatively large storage region required, depending on the radix of the algorithm, but computing the desired prestored values for storage therein takes some time.

In accordance with the technique of the invention, however, such calculations are effectively performed "on-the-fly" by using suitable circuit elements which are already available for use in multiply operations, thereby saving the cost and spatial memory requirements for the conventionally prestored product values and also performing such operation more quickly than using the prestore approach.

Figure 3:
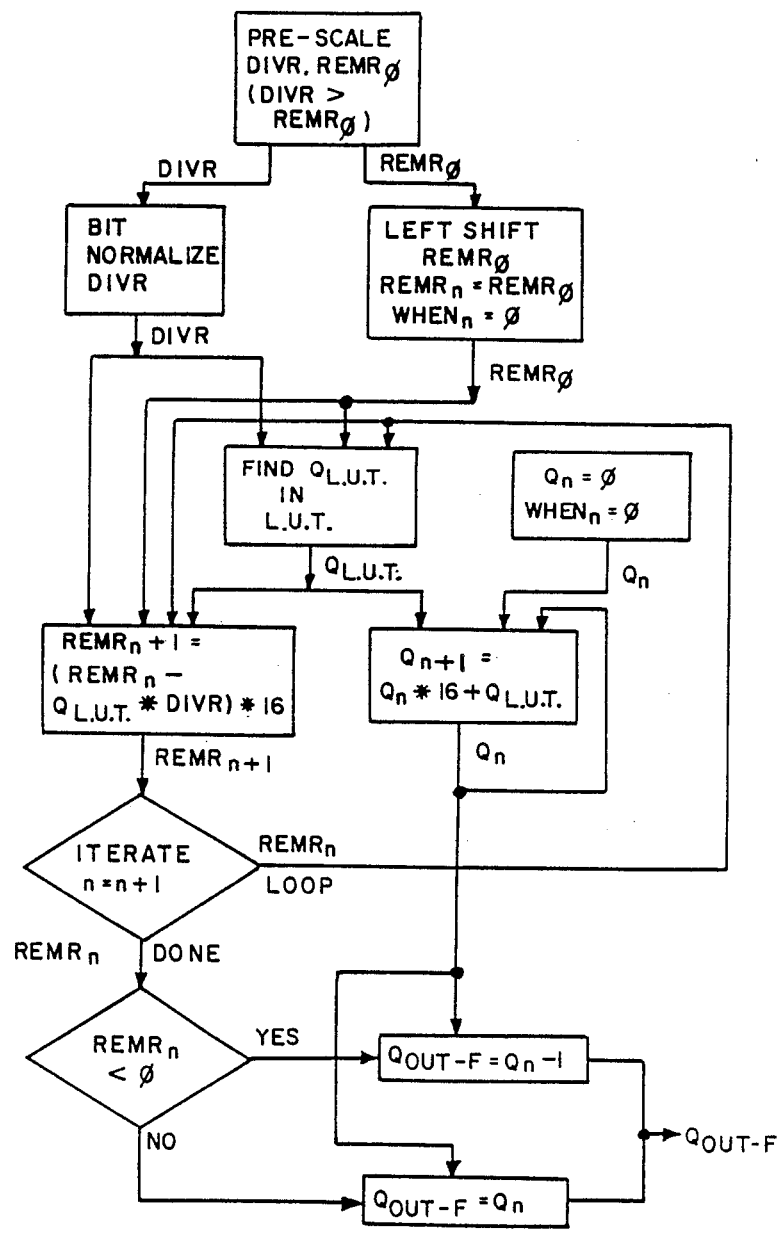
FIG. 3 depicts a flow chart showing the steps of a divisional algorithm.

FIG. 3 shows a flow chart which depicts the steps of an algorithm for performing a high radix algorithm (e.g. one having a radix of 16) for a divide operation for mantissas in a floating point computation process. Initially the divisor (DIVR) and the initial remainder (REMR0) are pre-scaled in accordance with conventional procedures, the divisor being greater than the remainder. The divisor is bit normalized, i.e. bit shifted to the left, to remove the leading zero bits thereof. The initial remainder (REMR0) thereof is also adjusted by being bit shifted to the left by the same number of bits as the divisor. The quotient is also initialized to zero. An iterative process using "n" iterations is then utilized to determine the final output quotient ($Q_{out-F}$) as follows.

The initial $Q_n$ (where n=0), together with the initial remainder $REMR_0$ and the divisor DIVR are used to produce the remainder $REMR_{n+1}$ (again when n=0) as the difference between the initial $REMR_0$ and the quantity representing the initial $Q_O$ times the divisor ($Q_0$*DIVR) all at radix 16. Such value is then used, together with the divisor, to look up the next quotient value (shown as ($Q_{LUT}$) in the iteration process using a look-up table, as depicted.

The output $Q_{LUT}$ from the look-up table is fed back and added to the previous $Q_n$ value so as to produce a new accumulated quotient value, $Q_{Acc}$. Such value as well as the previously calculated value of $REMR_{n+1}$ are used to calculate the next new value of $REMR_{n+1}$. The process is repeated n times, i.e., for n iterations, the quotient value being up dated to its next accumulated value after each iteration. When n iterations have been performed, the final accumulated value obtained from the look-up table represents the desired output quotient value $Q_{OUT}$ of the overall division operation. If, after the final iteration, the remainder is negative, a "1" is subtracted to produce the desired final quotient output $Q_{out-F}$. If the remainder is not negative, the value obtained from the L.U.T. after n iterations is utilized as is for the final quotient value for $Q_{out-F}$. This technique compensates for the approximate values of $Q_{LUT}$ obtained from the L.U.T. to obtain a machine ideal result.

While the overall process depicted by the flow chart of FIG. 3 is generally the same as that which is used conventionally for a higher radix divide operation, heretofore the computation of ($Q_n$*DIVR)*16 discussed above has never been performed on-the-fly but has been obtained from prestored values, as discussed above. By performing such computation on-the-fly the overall operation can be made to perform faster. Moreover such computation can be performed using selected components of the multiplier circuitry which are already available in a floating point computation unit for multiply operations. Such multiplier circuitry is discussed in connection with the block diagram of FIG. 4 and the divide operation using selected components thereof is discussed with reference to FIG. 5.

Figure 4:
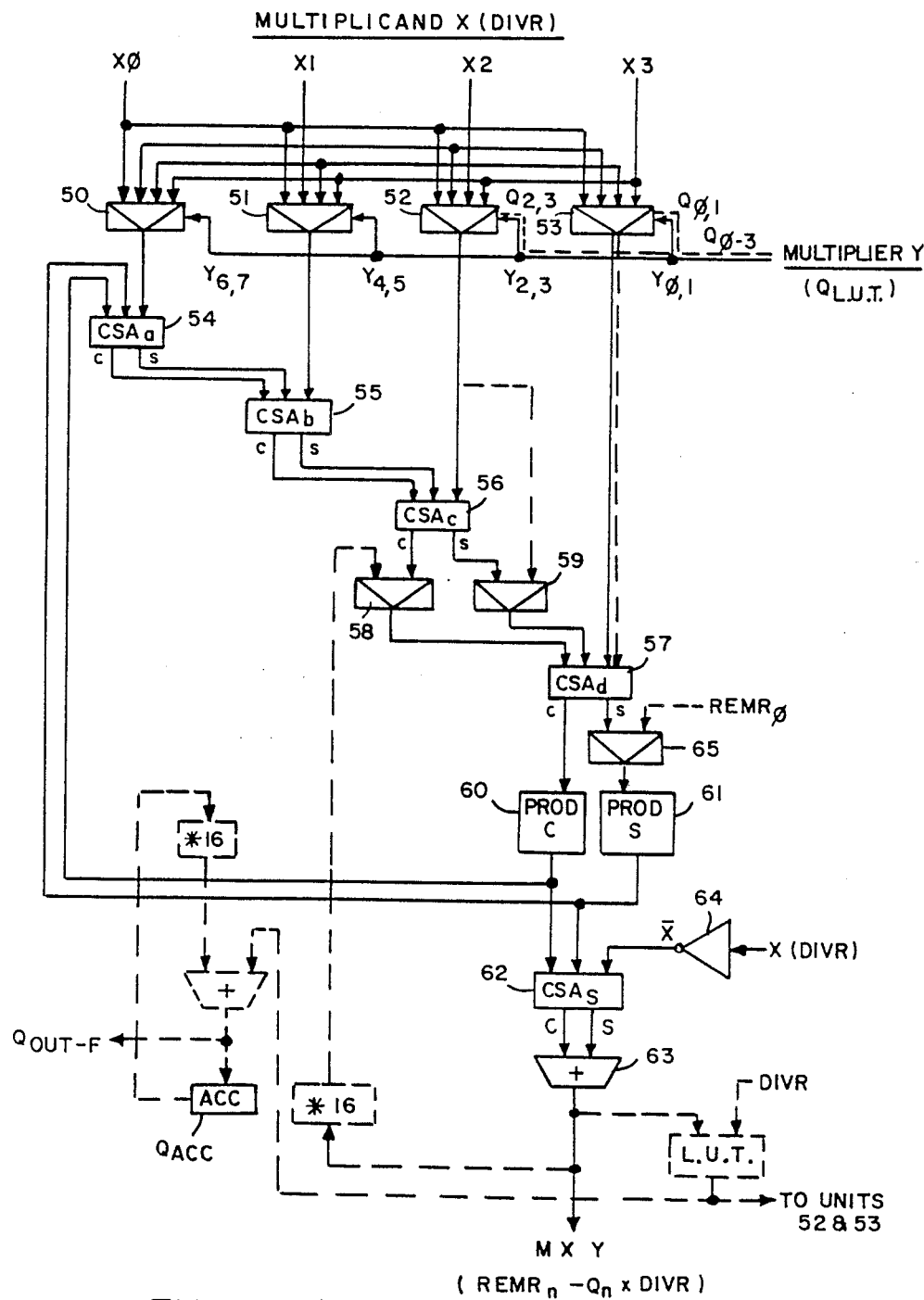
FIG. 4 depicts a multiplier-circuit for use in a floating point computation.

The circuitry of FIG. 4 for multiplier operations makes use of a well known 2-bit recode technique utilizing carry save adder (CSA) circuits, as described for example in "Computer Systems Architecture" by Jean-Loup Baer, Computer Science Press, 1980, pp.105-106. Using a multiplicand value X and a multiplier value Y each 2-bits of the 8-bit multiplier Y is effectively initially multiplied, using multiplexer circuits 50-53 to which are supplied, respectively, by the values 0, one times the multiplicand, two times the multiplicand and three times the multiplicand, as shown therein and as would be well known to those in the art.

The outputs of multiplexers 50-53 are respectively supplied as one of the inputs of a plurality of carry-save-adder (CSA) circuits 54-57. Thus, the output of multiplexer 50 is supplied to $CSA_a$ 54, the output of multiplexer 51 to $CSA_b$ 55, the output of multiplexer 52 to $CSA_c$ 56 and the output of multiplexer 53 to $CSA_d$ 57. The carry (C) and sum (S) outputs of CSA 54 are supplied as the other two inputs of CSA 55, the C and S outputs of which are supplied to the other two inputs of CSA 56 and, the C and S outputs of which are in turn supplied to CSA 57 via multiplexers 58 and 59 when in the multiply mode. The C and S outputs of CSA 57 are supplied to partial product registers PROD C 60 and PROD S 61 (the S output of CSA 57 being supplied through a multiplexer 65 during the multiply mode). Such partial products from registers 60 and 61 are fed back into the inputs of CSA 54. The accumulated partial products obtained during each feed back iteration are temporarily stored in registers 60 and 61.

When the overall multiply operation is concluded, the final C and S accumulated partial products in PROD C 60 and PROD S 61 are added by adder circuit 63 to supply the final product output, namely, X times Y. If the multiplier Y is negative, a sign correction must occur before adding such final accumulated partial product C and S values and such operation is performed by utilizing a further $CSA_s$ 62 between the outputs of the product registers 60 and 61 (supplied to two inputs thereof) and the adder circuit 63. The inverse of the multiplicand X is supplied to the third input of $CSA_s$ 62 for such purpose.

The circuitry and operation depicted in FIG. 4 and described above are well known to those in the art for performing a multiply operation. In accordance with the invention, selected circuit elements thereof can be adapted for use in a division mode for computing the value $REMR_{n+1}=(REMR_n-Q_n*REMR)*16$ in the algorithm of FIG. 3, and a small amount of additional circuit elements can be used to compute the final output quotient value $Q_{OUT-F}$, as shown by the dashed lines in FIG. 4. Thus during a divide mode, multiplexers 58 and 59 provide the necessary inputs to CSA 57, the remaining units 60-65 being utilized during the divide operation for producing the desired multiplied quantity in the divide algorithm. In order to clarify the operation and to simplify the drawing, the components of the multiplier circuit of FIG. 4 which are required for a divide operation are shown more succintly in FIG. 5, it being assumed that multiplexers 58 and 59 have been placed in the divide mode and that multiplexer units 50 and 51, as well as CSA units 54, 55 and 56 are not required for the division operation.

Figure 5:
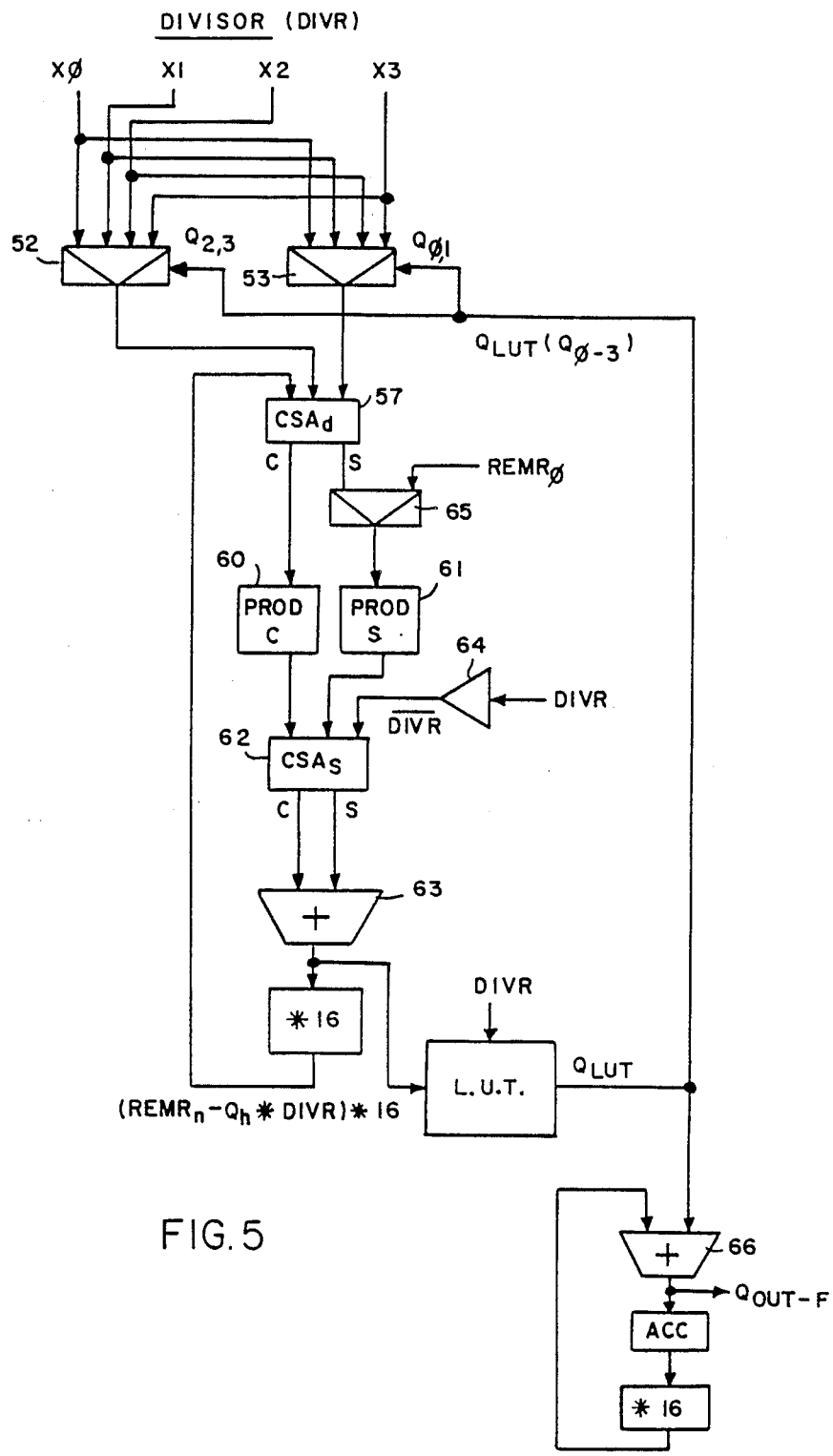
FIG. 5 depicts selected components of the multiplier circuit of FIG. 4 for use in performing a portion of the algorithm of FIG. 3 in accordance with the invention.

As can be seen in FIG. 5, the divide operation makes use of multiplexer units 52 and 53, CSA units 57 and 62, as well as adder circuit 63. In the divide process the divisor (DIVR) is supplied to multiplexers 52 and 53 in the same manner as the multiplicand was supplied to the multiplexers in a multiply process. The quotient $Q_{L.U.T.}$ (bits $Q_{0-3}$) as shown are supplied to mulitplexers 52 and 53 in a similar manner to that when the multiplier bits are supplied in the multiply process. The outputs of multiplexers 52 and 53 are supplied as two of the inputs to CSA 57, the C and S outputs therefrom being supplied to registers 60 and 61 as discussed above. In the case of the computation required for the divide process, the initial value of the remainder ($REMR_0$) is initially supplied at the start of the division process in FIG. 5 to the PROD S register 61 via multiplexer 65. Once the initial value of the remainder is supplied for the iterative divide operation involved, multiplexer 65 is placed in a mode which continuously supplies the S output from CSA 57.

In order to provide for any sign correction which may be necessary with respect to the divisor, the inverse of the divisor (DIVR) and the C and S accumulated partial product values from registers 60 and 61 are supplied to the sign correcting $CSA_s$ 62.

At the completion of the iterative process the final C and S outputs of $CSA_s$ 62 are supplied to adder circuit 63 the output of which represents the quantity $(REMR_n - Q_n*DIVR)*16$. Such C and S outputs during the iterative process are supplied as feedback inputs to CSA 57. When each iteration is complete and the output of adder circuit 63 representing the final value of the quantity $(REMR_n - Q_n*DIVR)*16$ is produced, such quantity is supplied to a look-up table, L.U.T. 64, to which the divisor value is also supplied so as to produce the quotient $Q_{L.U.T.}$ therefrom. The quotient from the look-up table 64 is accumulated using adder circuit 66, the output $Q_{Acc}$ thereof being fed back to an input thereof and having added thereto the next $Q_{LUT}$. After n iterations the output of adder circuit 66 is the final quotient value, $Q_{OUT-F}$. In each case the outputs of adder circuits 63 and 66 are left-shifted by 4-bits as is required for a radix 16 operation.

Thus, the desired quantity $(REMR_n - Q_n*DIVR)*16$ at the output of adder 63 is computed on-the-fly by using available selected components of the multiplier circuit and can then be used to provide the final output quotient in a divide operation as described above. Such overall operation provides a faster divide operation than using conventionally known techniques discussed above, as well as reducing considerably the storage requirements required in such conventional divide operation.

While the inventive techniques discussed above with reference to the performance of mantissa subtraction, normalization, and division operations in a floating point unit represent preferred embodiments thereof, modifications thereof may occur to those in the art within the spirit and scope of the invention. Hence, the invention is not to be construed as limited to such specific embodiments except as defined by the appended claims.

What is claimed is:

1. A system for providing a sign/ magnitude subtraction operation for a first operand A and a second operand B, said system comprising propagate-generate means comprising a plurality of propagate-generate computation stages responsive to said first and second operands for producing intermediate propagate and generate outputs and final propagate and generate outputs, a first one of said stages producing an intermediate propagate output;

a first carry computation means responsive to said final propagate and generate outputs and to a carry-in bit for producing final carry outputs and a carry-out bit;

means responsive to said final carry outputs and to a selected intermediate propagate output for producing a first subtraction result $(A - B)$;

a second carry computation means responsive to the same said final propagate and generate outputs for producing second final carry outputs;

means responsive to said second final carry outputs and to said selected intermediate propagate outputs for producing a second subtraction result $(B - A)$; and means responsive to said carry out bit for selecting one of said first or second subtraction results as the subtraction result of said sign/magnitude subtraction operation.

2. A system in accordance with claim 1 wherein said first carry generate means comprises a plurality of first carry generate computation stages.

3. A system in accordance with claim 1 wherein said carry generate means comprises a plurality of second carry generate computation stages.

4. A system in accordance with claim 1 wherein said selected intermediate propagate output is from the first computation stage of said plurality of propagate-generate stages.

5. A system in accordance with claim 1 wherein the means for producing said first and said second subtraction results each include a plurality of exclusive-OR gates.

* * * * *